United States Patent [19]
Marschke

[11] Patent Number: 5,088,590
[45] Date of Patent: * Feb. 18, 1992

[54] SYSTEM FOR CHANGING THE SPEED OF CONVEYED SHEETS WHILE HOLDING REGISTER

[75] Inventor: Carl R. Marschke, Phillips, Wis.

[73] Assignee: Marquip, Inc., Phillips, Wis.

[*] Notice: The portion of the term of this patent subsequent to Jan. 29, 2008 has been disclaimed.

[21] Appl. No.: 638,121

[22] Filed: Jan. 7, 1991

Related U.S. Application Data

[63] Continuation-in-part of Ser. No. 502,175, Mar. 30, 1990, Pat. No. 4,987,991.

[51] Int. Cl.$^5$ .............................................. A65G 47/31
[52] U.S. Cl. ........................................ 198/461; 198/579
[58] Field of Search .............. 198/461, 579, 604, 611, 198/620; 271/270, 202, 119

[56] References Cited

U.S. PATENT DOCUMENTS

| | | | |
|---|---|---|---|
| 2,279,573 | 4/1942 | Lang | 198/461 |
| 2,580,469 | 1/1952 | Schwartz | |
| 3,827,545 | 8/1974 | Buhayar | |
| 3,830,355 | 8/1974 | Verjux | 198/461 X |
| 3,978,969 | 9/1976 | Williams et al. | 198/461 |
| 4,084,807 | 4/1978 | Terajima et al. | 271/119 |
| 4,319,740 | 3/1982 | Ulseth | 271/119 X |
| 4,364,552 | 12/1982 | Besemann | 271/202 X |
| 4,377,172 | 3/1983 | Burger et al. | 198/461 X |
| 4,696,462 | 9/1987 | Tanaka et al. | 271/119 X |
| 4,781,368 | 11/1988 | Gammerler | 271/270 |

FOREIGN PATENT DOCUMENTS 0254446 11/1986 Japan .................................. 271/270

Primary Examiner—D. Glenn Dayoan
Attorney, Agent, or Firm—Andrus, Sceales, Starke & Sawall

[57] ABSTRACT

A system for changing the speed of conveyed sheets while maintaining the sheets in register including a speed changing belt operating at a constant speed to present a radial outer surface portion which travels over a cylindrical guide and into tangent contact with the surface of the sheet traveling at a speed equal to the velocity of the incoming sheets. A portion of the speed changing belt includes an acceleration lobe positioned to engage the trailing portion of the sheet and to provide a continuously increasing radius at the tangent contact portion as the belt travels around the pulley whereby the outer surface velocity of the lobe and the sheet in contact therewith continuously increase from the incoming speed to a desired second speed. The constant velocity speed changing belt requires only a simple constant speed drive and the speed change lobe attached to the belt requires only a relatively small increase in the effective radius of the belt around the cylindrical guide such that unacceptable vertical displacements of the sheet from the plane of travel are obviated. Only the mass of the sheet or other product being conveyed (and an upper holddown idler roll if used) is subject to acceleration (or deceleration) forces as all the machine drive components run at constant velocity during the speed change, thereby minimizing the overall inertial effects.

6 Claims, 3 Drawing Sheets

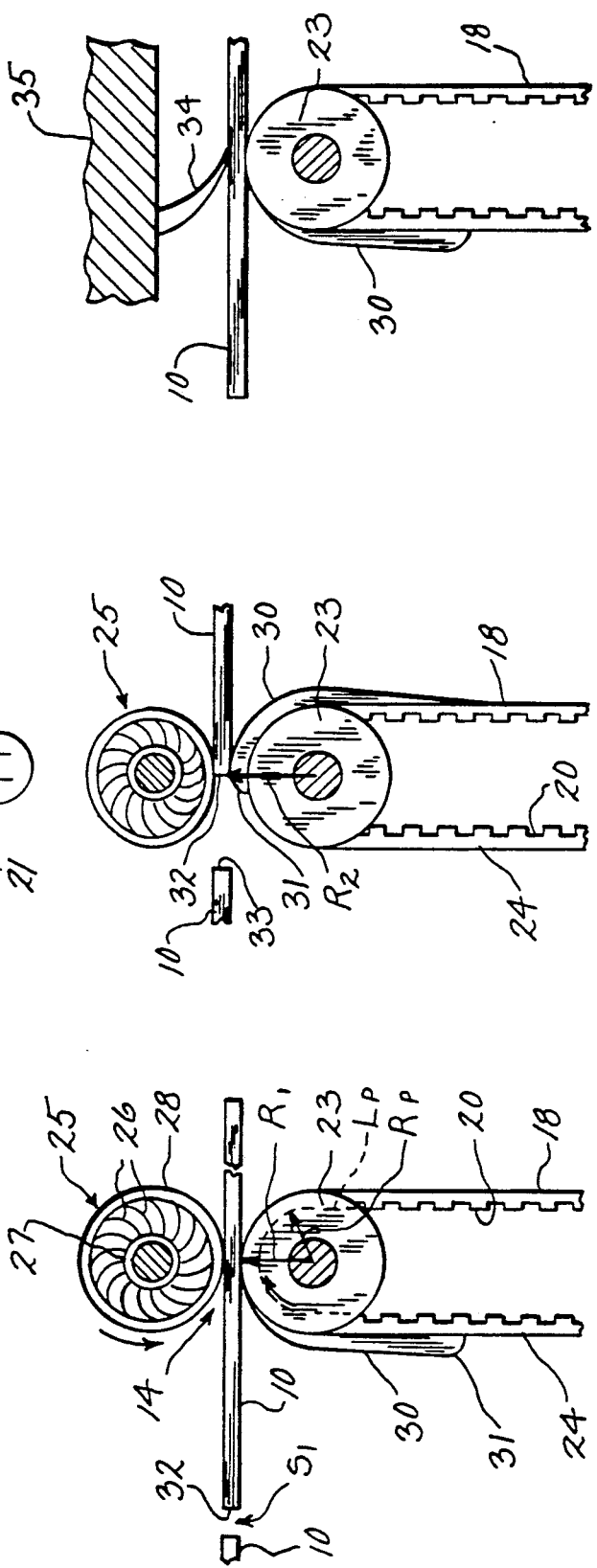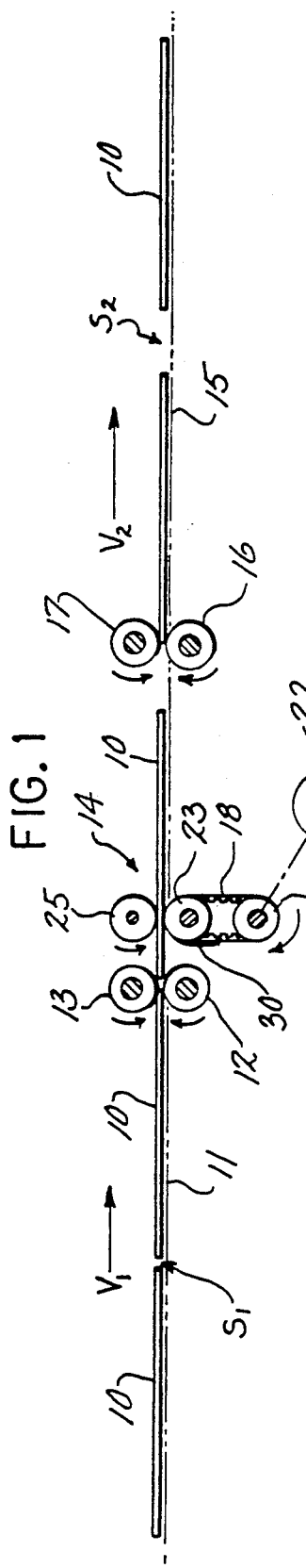

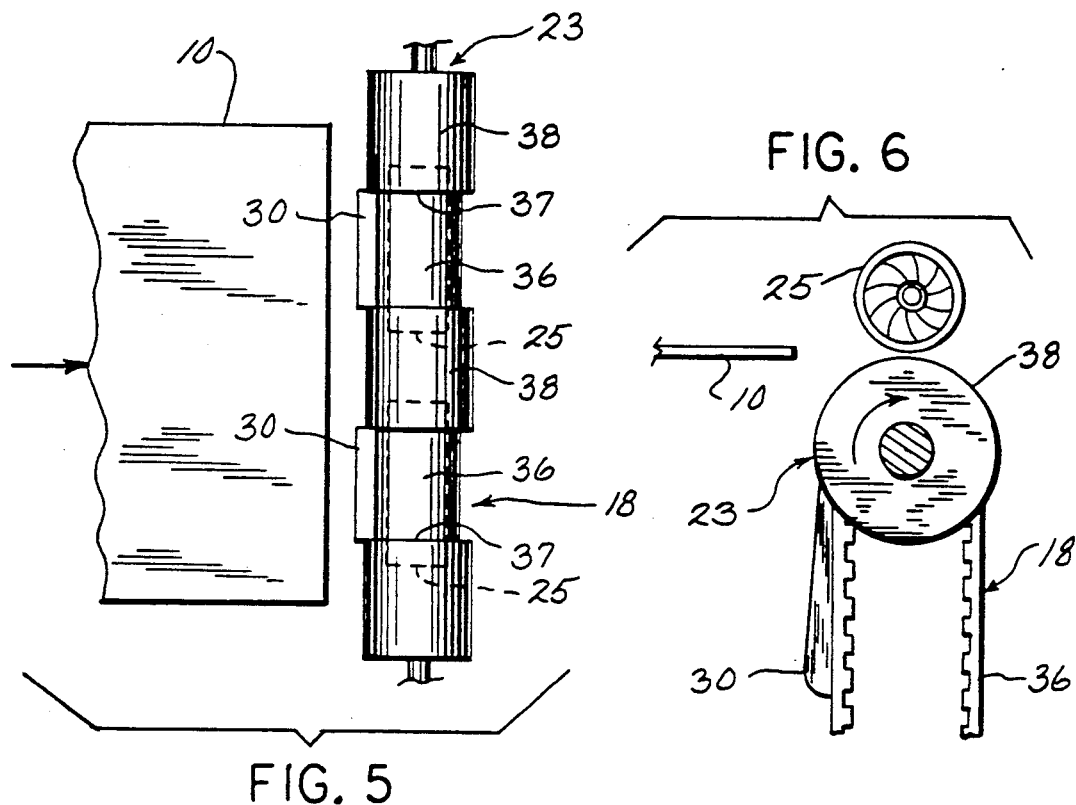
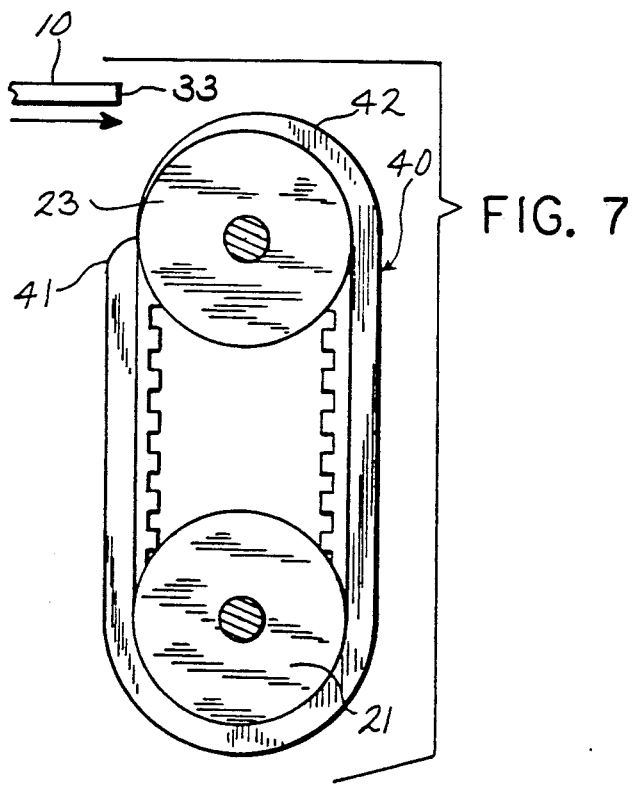

SYSTEM FOR CHANGING THE SPEED OF CONVEYED SHEETS WHILE HOLDING REGISTER

This is a continuation-in-part of application Ser. No. 07/502,175, filed Mar. 30, 1990, now U.S. Pat. No. 4,987,991.

BACKGROUND OF THE INVENTION

The present invention related to the high speed conveying of products of various shapes and sizes including discrete sheets of material, such as sheets of corrugated paperboard. More particularly, the present invention pertains to a system for changing the speed of conveyed sheets while holding the same in register.

In the high speed handling of individual sheets of corrugated paperboard or similar sheet materials, sheets of uniform size are often conveyed in "register" such that a uniform spacing is maintained between sheets. Uniform edge to edge spacing or pitch spacing of the sheets is necessary so that the sheets may be fed serially and accurately into timed downstream processing equipment such as may be used, for example, to cut or fold the sheet. Corrugated paperboard sheets may be conveyed at speeds of 1,500 feet per minute and, in order to maintain register, the sheets are typically conveyed between upper and lower conveying means which hold the positions of the sheets. Other products of various sizes and shapes are also often conveyed and delivered for processing in a manner requiring accurate control of speed and spacing.

It is also often necessary or desirable to change the speed of sheets being conveyed while maintaining accurate sheet register. Correspondingly, it may be desirable to increase or decrease the spacing between sheets, but again on a uniform basis such that register is maintained. With slow moving sheet materials a change in speed and spacing may be effected by moving the sheets from an upstream conveyor operating at a first speed to a downstream conveyor operating at a second speed via an intermediate speed change conveyor utilizing variable speed drives, clutch mechanisms or the like to change the speed of the sheets from the first to the second speed. Such a variable speed drive for changing the pitch spacing and speed of conveyed sheets is shown in U.S. Pat. No. 3,827,545. The mechanical speed changing mechanism of the intermediate transfer conveyor, though satisfactory for sheet materials conveyed at relatively low speeds, is wholly unsatisfactory for handling corrugated board at high speeds.

U.S. Pat. No. 2,580,469 also shows a device for changing the speed of conveyed sheets. That device utilized a pair of counterrotating cams between which the sheet is fed from a first conveyor such that the increase or decrease in the radius of the cam surfaces causes a corresponding increase or decrease in the speed of the sheet being conveyed therebetween. Although satisfactory for relatively slow moving sheets, the extreme variation in the radii of the cams as they rotate in contact with the sheet results in a severe vertical deflection of the sheet which is totally unacceptable in a high speed handling situation where such deflection would tend to bend, break or otherwise damage relatively fragile corrugated board stock.

It would be desirable, therefore, to have a system which is capable of changing the speed and spacing of corrugated board sheets being conveyed at high speed while maintaining the register thereof. Such a system would preferably eliminate the need for complex mechanical speed changing mechanisms or the use of speed changing cams imparting severe vertical deflection to the conveyed sheets. It is anticipated that a system for handling sheet materials would be readily adaptable for handling products of other shapes and sizes as well.

SUMMARY OF THE INVENTION

In accordance with the present invention, sheets of material being conveyed in register are accelerated or decelerated to a second speed while maintaining register by utilizing an intermediate speed changing belt operating at a constant linear speed, but specially configured to change the speed of the sheet received from the upstream conveyor to the speed of the downstream conveyor and to retain hold of and prevent the board from slipping during the speed change and sheet transfer.

The speed changing belt operates via positive driving engagement around a pulley positioned tangent to the surface of the sheets and rotating in the direction of sheet movement. At least a portion of the length of the speed changing belt comes into tangent contact with the sheets as the belt travels around the pulley. The speed changing belt operates at a constant linear speed which is established to provide an instantaneous velocity at the outer belt surface as it travels around the pulley and makes initial contact with the sheet which velocity is equal to the speed of the infeed conveyor. A flexible holding means is disposed on the opposite side of the sheets from the pulley and is positioned to contact the surface of the sheets and to form with the belt and pulley a nip for receiving sheets from the infeed conveyor. The speed changing belt includes a speed change lobe which presents a region of continuously changing radius as the lobed region of the belt operates around the pulley, such that the outer surface of the belt including the lobe at the tangent contact with the sheet operates at a continuously changing speed which varies from the speed of the infeed conveyor or the speed of an outfeed conveyor.

When utilized in this preferred manner as a system for accelerating sheets and increasing the spacing thereof, the acceleration lobe comprises a length along the belt of uniformly increasing belt thickness. The speed change lobe need only have a length equal to a portion of the length of a sheet such that the increase in thickness is gradual enough to allow an increase in the contacting radius to accelerate the sheets without slippage.

The resilient holding means may comprise a low inertia idler roll positioned with its axis of rotation parallel to the axis of the pulley. The axis of the low inertia idler roll is fixed and the outer surface which contacts the sheets is resilient so that the upward deflection of the sheets as the radius of the speed changing belt increases around the belt pulley may be accommodated. Alternatively, the resilient holding means may comprise a flexible finger mechanism which is biased into engagement with the sheets. In the case of the flexible finger mechanism, the resilient holding means must be provided with a coefficient of surface friction substantially lower than that of the pulley and the speed changing belt such that non-slipping conveying engagement may be maintained between the pulley/speed change belt combination and the sheets.

In the presently preferred embodiment, the acceleration belt is positioned below the plane of the sheets such that it contacts the bottom surfaces thereof. In one preferred embodiment, the pulley includes a peripheral surface portion which provides initial tangent contact with the sheets, while they are still simultaneously held by the infeed conveyor, and the acceleration belt is recessed in the peripheral surface of the pulley, except for the acceleration lobe which extends radially beyond the pulley surface as the lobe passes around the pulley.

In another embodiment, the belt carrying the upper pulley may be replaced with a non-rotating cylindrical low friction guide means, such as an air bearing. It is also possible to mount the speed change belt and belt carrying mechanism to deflect vertically during movement of the speed change lobe past the tangent contact point to maintain the sheets in the same place and eliminate completely their vertical defection.

BRIEF DESCRIPTION OF THE DRAWINGS

FIG. 1 is a side elevation of a schematic representation of the speed changing system of the present invention.

FIG. 2 is an enlarged side elevation of the speed changing mechanism showing the conveyed sheet in its FIG. 1 position operating at the speed of the infeed conveyor.

FIG. 3 is a side elevation view similar to FIG. 2 showing a sheet leaving the speed changing mechanism at the increase velocity of the outfeed conveyor.

FIG. 4 is a view similar to FIGS. 2 and 3 showing an alternate construction for the flexible holding means operating in conjunction with the speed changing pulley and belt.

FIG. 5 is a top plan view of a combined pulley and acceleration belt of the presently preferred embodiment.

FIG. 6 is a side elevation of the apparatus of FIG. 5.

FIG. 7 is an enlarged side elevation similar to FIG. 2 showing an embodiment of the speed change belt for decreasing the speed of the sheets.

DETAILED DESCRIPTION OF THE PREFERRED EMBODIMENT

Figure 8:
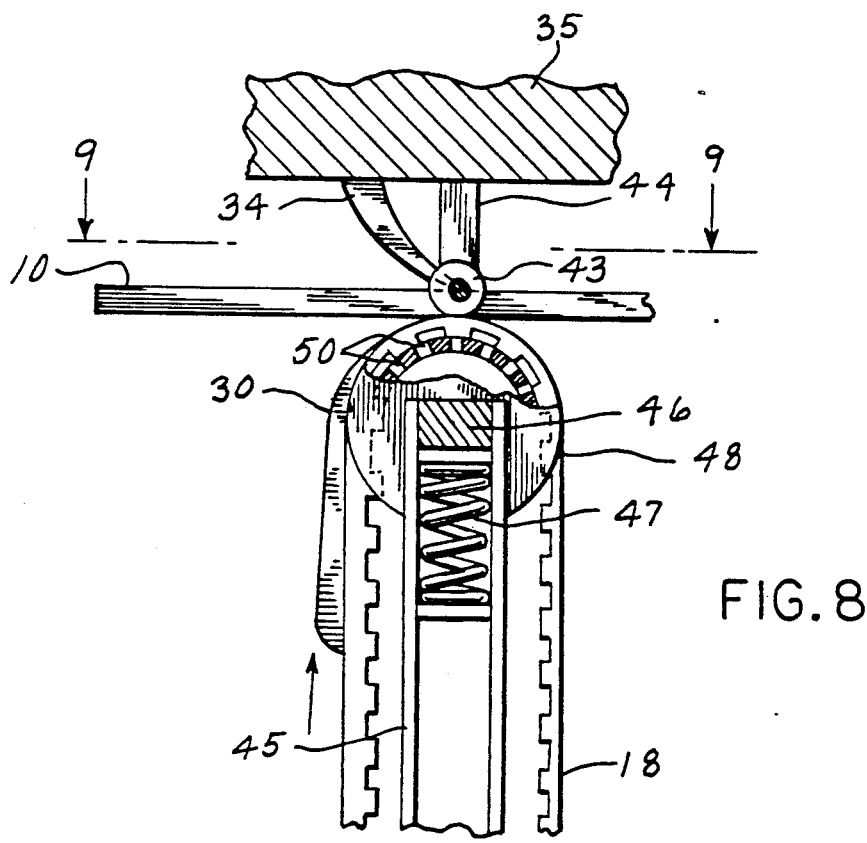
FIG. 8 is a side elevation of another embodiment of the invention.

Referring first to FIG. 1, a series of sheets 10 are shown being conveyed on a first infeed conveyor 11 at a velocity $V_1$. The infeed conveyor 11 may be of any suitable type, including a driven belt or live roll conveyor, and includes at its downstream end a pair of driven rolls 12 and 13 which maintain positive hold of the sheet 10 and, with similar sheet engaging upstream rollers (not shown), and maintain a uniform equal spacing $S_1$ between the sheets 10. In other words, the sheets are maintained in register as they are conveyed over the infeed conveyor 11.

The system of the present invention includes an intermediate speed change mechanism 14 which accelerates (or decelerates) sheets received from the infeed conveyor 11, increases (or decreases) the speed of the sheets to that at which a second outfeed conveyor 15 is operating, and simultaneously increases (or decreases) the spacing $S_2$ therebetween. The downstream outfeed conveyor 15 may also be of any suitable construction which will positively hold the sheets 10 and maintain them in register. As such, the outfeed conveyor 15 may include a series of pairs of driven rolls 16 and 17, only the upstream-most pair of which is shown in the drawing.

The description of the speed change mechanism 14, set forth hereinafter, relates specifically to a mechanism for accelerating the sheets 10 to a higher velocity and increasing the spacing therebetween. However, with suitable changes, the speed change mechanism can be adapted to decelerate sheets and decrease the spacing therebetween. Also, when used as a sheet acceleration mechanism, the system of the present invention can handle corrugated paperboard sheets or other similar sheet materials which are disposed on the infeed conveyor 10 in abutting end to end relation (no spacing $S_1$)

Referring also to FIG. 2 and 3, the speed change mechanism 14 of the system of the present invention is positioned downstream from the end of the infeed conveyor 11 (as defined by the driven rolls 12 and 13) by a distance substantially less than the length of a sheet 10. Thus, a sheet 10 passing between driven rolls 12 and 13 will enter the speed change mechanism while it is still engaged by the rolls 12 and 13. The speed change mechanism includes an acceleration belt 18 which is driven at a constant speed around a pulley to provide a radially outer surface speed at the point of initial contact with the sheet equal to the speed $V_1$ of the infeed conveyor 11 as will be described in more detail hereinafter. The belt 18 is preferably constructed in the manner of a conventional timing belt to include a ribbed or toothed configuration 20 on its underside adapted to engage a similar toothed drive sprocket 21 driven by a drive motor 22. The acceleration belt 18 also operates about an upper pulley 23 which may also be provided with teeth to be engaged by the tooth pattern 20 on the belt to prevent slipping of the pulley with respect to the belt. The belt 18 has a flat outer surface 24 over the greater portion of its length and it is synchronized with the sheets incoming from the infeed conveyor 11 of the pulley 23 such that, as it passes around the pulley, the surface of the belt is either at or slightly below the periphery of the pulley defined by the radius $R_1$ (FIG. 2). Alternatively, the uniform outer surface portion 24 of the belt may extend slightly beyond the outer periphery of the pulley 23. Thus, either or both of the outer surface of the pulley or the radial outer surface of the belt traveling around the pulley may provide initial tangent contact with an incoming sheet 10 and, because the speed of the tangent contact surface belt is set to coincide with the speed of $V_1$ of the infeed conveyor 11, the sheet 10 will initially pass through the speed change mechanism 14 at the initial speed $V_1$.

As is well known in the art, the pitch line $L_p$ of the belt 18 (FIG. 2) inherently lies some distance below the outer surface 24 of the belt. In other words, the pitch line radius $R_p$ is less than the radius $R_1$ to the outer surface of the belt. Therefore, the outer surface of the belt as it travels around pulley 23 and in contact with the sheet will be moving at a velocity greater than the radially inner pitch line speed. As a result, the linear speed of the belt must be established and set at a speed less than $V_1$. Specifically, the pitch line speed $V_p$ is less than $V_1$ by a factor equal to the ratio of the radii $R_p/R_1$ (see FIG. 2). Similarly, as the belt 18 makes a complete revolution around pulleys 21 and 23, the total motion or distance of travel of the outer surface of the belt will exceed the total pitch line distance or pitch length of the belt by approximately the factor $R_1/R_p$. As will become apparent from the example set forth below, the distance of travel by the outer surface of the belt in one revolution is greater than the pitch spacing (repeat length) of the sheets ($L+S_1$) by an amount dependent on the magnitude of the length and thickness of the speed change lobe, the function of which will be described.

A resilient low inertia idler roll 25 is positioned above the pulley 23 and in engagement with the upper surface of the sheet 10. The belt 18 and pulley 23 make tangent contact with the lower surface of the sheet and the idler roll 25 makes tangent contact with the upper surface of the sheet to define therebetween a nip for holding and conveying the sheets through the speed change mechanism. In addition to being of light weight and low inertia, the idler roll 25 comprises an interior having a series of generally radially extending flexible fins 26 which interconnect a central hub 27 and a flexible outer cylindrical surface portion 28. The idler roll thus provides means for resiliently holding the sheet in contact with the belt 18 and pulley 23 to maintain register between the belt and the sheet. The entire outer surface of the belt 18 and the outer peripheral surface of the pulley 23 (if the latter is constructed to engage the sheet) are provided with a high coefficient of friction surface to maintain positive driving contact with the sheet.

A portion of the length of the acceleration belt 18 is provided with an acceleration lobe 30 which is shaped to define a continuously increasing radius at the point of tangent contact between the belt and the sheet 10 as the belt travels around the pulley 23. Referring particularly to FIG. 2 and 3, the acceleration lobe 30 comprises a portion raised from the outer surface 24 of the belt which increases in thickness from the belt surface uniformly to an upstream end 31 of maximum thickness. As the acceleration lobe 30 travels around the pulley 23 the radius at the point of tangent contact with the sheet increases from the minimum $R_1$ (FIG. 2) to a maximum $R_2$ (FIG. 3) as the upstream end 31 of the lobe reaches the top of the pulley in engagement with the sheet. Therefore, the velocity of the outer surface of the lobe and the sheet being conveyed thereon will increase from the incoming velocity $V_1$ to the second speed $V_2$. The acceleration lobe 30 is constructed to provide uniform acceleration and has a length and register with the sheet such that the upstream edge 32 of the sheet 10 coincides with the upstream end 31 of maximum lobe thickness and radius $R_2$, as shown in FIG. 3.

As an example, assume that it is desired to increase the speed $V_1$ of incoming sheets to a speed $V_2$ which is 120% of $V_1$. Assume also sheets 10 are 48 inches long and spaced from one another by 2 inches, thereby comprising a sheet pitch spacing or repeat length of 50 inches. The acceleration lobe 30 on the belt 18 is constructed to provide a radius $R_2$ which is 120% of the radius $R_1$ and, as previously indicated, belt 18 is operating at a constant linear speed to provide a peripheral speed at the outer belt surface on pulley 23 equal to $V_1$. If the transition from $R_1$ to $R_2$ is provided with an acceleration lobe 30 having a length of 10 inches, the sheet 10, from its FIG. 2 position to its FIG. 3 position, will travel 11 inches, because of the average increase in the effective radius of the lobe at the point of contact with the sheet of 10%. The acceleration of the sheet over its last 11 inches of travel over the lobe 30 results in a one inch increase in the space from the trailing edge 32 to the leading edge 33 of the following sheet. Thus, the sheet spacing increases from $S_1$ of 2 inches in FIG. 2 to an intermediate spacing of 3 inches in FIG. 3. At this point, leading sheet 10 is traveling at $V_2$ and the trailing sheet is still traveling at $V_1$. This difference in velocities between the two sheets will continue until the trailing sheet reaches the position shown in FIG. 2 (where its trailing edge 32 is 11 inches from the acceleration belt nip). Thus, the trailing sheet must move through a distance of 40 inches (the 3 inch spacing plus the initial 37 inches of the sheet) before it beings to accelerate. In the meantime, the leading sheet 10 has been traveling at a speed which is 120% greater and, therefore, the spacing between trailing and leading edges 32 and 33 of these adjacent sheets will continue to increase at a constant rate. However, as the trailing sheet begins to accelerate (from the FIG. 2 to the FIG. 3 position) the rate of increase in the space will slow until the trailing edge 32 of the trailing sheet has been fully accelerated to speed $V_2$ (FIG. 3 position). At this point, the final spacing $S_2$ and the pitch spacing of the sheets is established. In the present example, the pitch spacing or repeat length is 60 inches (120% of 50 inches) and the sheet spacing $S_2$ is, therefore, 12 inches (60 inches minus 48 inches).

The driven rolls 16 and 17 at the inlet to the outfeed conveyor 15 are spaced from the nip of the speed change mechanism 14 by a distance equal to or just slightly less than the length of the sheet. In this manner, the sheet is positively held at all times in one or the other of the conveyor nips so that sheet register is maintained. In order to handle runs of sheets of a different length, rolls 16 and 17 are adjustable in the direction of travel to vary their distance from the speed change mechanism 14. Referring again to FIG. 3, as the leading sheet 10 leaves the nip formed by the acceleration belt 18 and idler roll 25 and is traveling at speed $V_2$, the leading edge 33 of the following sheet is approaching the nip. By the time the leading edge of the following sheet reaches the nip, the maximum thickness upstream end 31 of the acceleration lobe 30 will have traveled past the tangent contact point and the uniform flat surface 24 of the belt 18 is positioned to engage the following sheet 10. The following sheet, like the sheet immediately preceding it, will be engaged in the nip and continue to travel at the speed $V_1$ until it is engaged by the acceleration lobe 30, as shown in the FIG. 2 position, whereafter it is accelerated in an identical manner previously described.

In accordance with the system of the present invention, sheets may be readily accelerated (or decelerated) to a different speed and spacing and maintained in absolute register utilizing an acceleration belt which travels at a constant linear speed and, therefore, requires no complex speed changing mechanism. Correspondingly, no massive inertial changes in machine drive components are required and only the mass of the sheet 18 and the idler roll 25 are subject to acceleration (or deceleration) forces. Another important feature of the present invention is that the acceleration lobe 30 requires only a fairly nominal increase in the radius from $R_1$ to $R_2$ which does not result in any significant vertical displacement of the sheet or board as it is being accelerated. For example, a 4 inch diameter pulley 23 would require only a 0.4 inch maximum lobe thickness to effect a 120% increase in sheet velocity. By comparison, utilization of a prior art speed change device utilizing a rotating cam would require a roller having approximately a 16 inch diameter to accommodate sheets with a 50 inch pitch spacing. To effect a 20% increase in speed, the cam surface radius would have to increase from about 8 inches to about 9.6 inches, which would result in a vertical displacement of the sheet or board, likely to cause bending or damage and which would be intolerable.

As shown in FIG. 4, an alternate flexible holding means to the idler roll 25 of the preferred embodiment comprises a flexible finger 34 or series of such fingers which are attached to an upper support structure 35 and extend laterally across the sheet 10. The fingers 34 are biased into engagement with the sheet and will readily accommodate the upward vertical displacement thereof as the acceleration lobe 30 moves around the pulley 23 and under the sheet. The surfaces of the fingers 34 in contact with sheet 10 should have a low coefficient of friction so as not to interfere with the frictional engagement between the belt 24 and/or the pulley 23 with the sheet 10.

FIGS. 5 and 6 show another embodiment of an acceleration belt and pulley combination believed to be as effective as the embodiment of FIGS. 1–3. In the configuration, the acceleration belt 18 comprises a pair of spaced belts 36 which operate synchronously in recessed portions 37 in the pulley 23. The pulley 23 includes a series of spaced outer peripheral portions 38 defining the recessed portions 37 therebetween, which outer peripheral portions engage the sheet 10 over the incoming length thereof until the sheet is engaged by the acceleration lobes 30 on the spaced belts 36. As the lobes 30 travel over the pulley 23 and into tangent contact with the sheet 10, the lobes 30 rise radially out of the recessed portions 37 to engage and accelerate the sheet, as previously described. The thickness of the lobes 30 may be chosen to provide the desired increase in sheet velocity, as also previously described. The resilient idler rolls 25, which are shown in phantom in FIG. 5 so as not to obscure the construction of the modified pulley 23, are longer axially than the recessed portions 37. In this manner, the rolls 25 overlie the edges of the larger diameter outer peripheral portion 38 to hold the sheet in contact therewith until the sheet is engaged by the lobes 30.

In FIG. 7, there is shown a deceleration belt 40 which may be utilized to reduce the speed of sheets and the spacing thereof. The belt 40 has a generally enlarged uniform thickness along the greater portion of its length, beginning with a leading lobe 41 which is synchronized to make tangent contact with the leading edge 33 of the incoming sheet. The uniform thickness portion of the belt will maintain the sheet at its incoming velocity until the end portion 42 of the belt 40 reaches the top tangent portion of the pulley 23. The end portion is tapered to provide a uniformly decreasing belt thickness and, correspondingly, a uniformly decreasing radius as the end portion travels over the pulley and in tangent contact with the sheet. In a manner opposite the acceleration embodiment previously described, the sheet will decelerated from the incoming speed $V_1$ to a lower speed $V_2$ and the initial spacing $S_1$ between sheets will be correspondingly reduced to a smaller spacing $V_2$.

Figure 9:
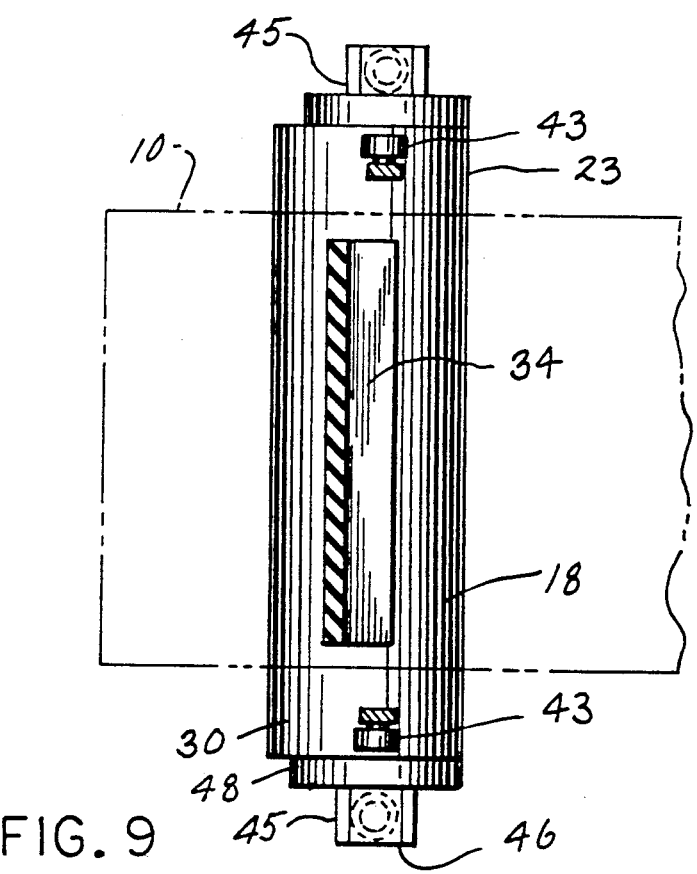
FIG. 9 is a top plan view of the mechanism shown in FIG. 8 taken on line 9—9 thereof.

Referring to FIGS. 8 and 9, there is shown another embodiment of the invention incorporating two significant changes. The pulley 23 of the previously described embodiments, carrying the acceleration belt 18, is replaced by a stationary air bearing 48. The air bearing is a cylindrical tubular member provided in an appropriate region of its outer surface with a pattern of air holes 50. The hollow interior of the air bearing is pressurized and the air escaping from the air holes 50 provides a virtually frictionless cushion over which the acceleration belt 18 travels. The diameter of the air bearing 48 may be generally the same as the diameter of the pulley 23 or it may have a substantially larger or smaller diameter to suit the size and length of the acceleration lobe 30, as well as the size and shape of the product being conveyed.

It may be desirable in certain applications to eliminate completely the slight vertical deflection of the sheets 10 as they are contacted by the acceleration lobe 30 while passing over the tangent contact point. To prevent vertical deflection and maintain the sheets 10 constantly coplanar, the entire speed change mechanism 14, including the acceleration belt 18, drive sprocket 21, and pulley 23 or air bearing 48, is mounted for vertical movement to compensate for the changing radius as the acceleration lobe 30 moves past the tangent contact point. A pair of rollers 43 are mounted to depend downwardly from the support structure 35 on mounting brackets 44 to engage the outer surface of the acceleration belt 18. The entire speed change mechanism 14 is attached to a slide mechanism 46 which is slideably mounted for vertical movement in a stationary vertical track 45. As the speed change lobe 30 comes into tangent contact with the sheet 10, it will also contact the rollers 43 and, as the radius of the belt carrying the speed change lobe around the air bearing 48 increases, the fixed position rollers 43 will force the entire speed change mechanism 14 to move downwardly. The slide mechanism 46 is adapted to move downwardly in the track 45 against the bias of a coil spring 47 mounted on the track in the path of the slide mechanism. The flexible holddown finger 34 is positioned and operates in the same manner as previously described, although it does not have to move in response to vertical deflection of the sheets as in the prior described embodiments.

Although the various embodiments of the invention have been described for handling relatively thin sheet materials, it is believed that the speed change mechanism of the present invention could be satisfactorily operated to handle a wide range of products of various shapes and sizes. Virtually any kind of product which is capable of being conveyed in the manner of sheets previously described could be accelerated or decelerated in the same manner while maintaining complete and accurate register.

Various modes of carrying out the present invention are contemplated as being within the scope of the following claims particularly pointing out and distinctly claiming the subject matter which is regarded as the invention.

I claim:

1. A system for changing the speed and spacing of discrete items being conveyed in register on a first conveyor operating at a first speed, said system comprising:
   a speed changing belt operating at a constant linear speed, said belt operating around an arcuate surface positioned to present a cylindrical portion of said belt operating at an initial peripheral speed equal to said first speed in tangent contact with the items;
   flexible holding means aligned with the tangent contact surface of said cylindrical portion and positioned to form therewith a nip for receiving items from said first conveyor; and,
   a speed change lobe on said belt defining a region of continuously changing radius as said belt operates around said arcuate surface, whereby the outer surface of the belt including said lobe at the tangent contact surface operates at a continuously changing speed from said first speed to a second speed.

2. The system as set forth in claim 1 including means mounting said belt and said arcuate surface for common vertical movement in response to said changing radius, whereby the items being conveyed remain in a constant horizontal plane.

3. The system as set forth in claim 2 wherein said mounting means comprises:
- a stationary vertical track;
- a slide mechanism supporting said belt and arcuate surface for reciprocating vertical movement on said track;
- belt contacting means mounted in a fixed position for engaging said belt and speed change lobe on the line of said tangent contact; and,
- resilient biasing means for maintaining engagement between said belt and said belt contacting means.

4. The system as set forth in claim 3 wherein said belt contacting means comprises a pair of rollers rotatably mounted on an axis parallel to said tangent contact line.

5. The system as set forth in claim 3 wherein said rollers are laterally spaced outwardly on opposite sides of the items being conveyed.

6. The system as set forth in claim 1 wherein said arcuate surface comprises a stationary cylindrical air bearing.

* * * * *